(12) United States Patent
Nienhaus et al.

(10) Patent No.: US 7,034,063 B2
(45) Date of Patent: Apr. 25, 2006

(54) MULTI-COMPONENT SYSTEM CONTAINING SOLVENTS, HARDENABLE BY THERMAL AND ACTINIC RADIATION AND THE USE THEREOF

(75) Inventors: Egbert Nienhaus, Ascheberg (DE); Bernhard Lettmann, Drensteinfurt (DE)

(73) Assignee: BASF Coatings AG, Munster (DE)

( * ) Notice: Subject to any disclaimer, the term of this patent is extended or adjusted under 35 U.S.C. 154(b) by 25 days.

(21) Appl. No.: 10/363,140

(22) PCT Filed: Oct. 1, 2001

(86) PCT No.: PCT/EP01/11311

§ 371 (c)(1),
(2), (4) Date: Mar. 4, 2003

(87) PCT Pub. No.: WO02/31015

PCT Pub. Date: Apr. 18, 2002

(65) Prior Publication Data

US 2003/0171449 A1    Sep. 11, 2003

(30) Foreign Application Priority Data

Oct. 2, 2000    (DE) .................... 100 48 847

(51) Int. Cl.
C03C 25/10   (2006.01)
C03C 25/24   (2006.01)
C03C 25/32   (2006.01)
C03C 25/26   (2006.01)

(52) U.S. Cl. ............... 522/91; 522/92; 522/93; 522/95; 522/97; 522/100; 522/101; 522/102; 522/104; 522/106; 522/79; 522/81; 522/83; 522/84; 522/85; 522/86; 522/170; 522/173; 522/174; 522/175; 522/178; 522/179; 522/182; 522/103; 522/107

(58) Field of Classification Search ............ 522/91, 522/90, 92, 93, 95, 97, 100, 101, 102, 104, 522/106, 79, 81, 83, 84, 85, 86, 170, 173, 522/174, 175, 178, 179, 182, 103, 107

See application file for complete search history.

(56) References Cited

U.S. PATENT DOCUMENTS

| | | | |
|---|---|---|---|
| 4,342,793 A | 8/1982 | Skinner et al. | 427/44 |
| 5,234,970 A | 8/1993 | Kyle | 522/96 |
| 5,997,682 A * | 12/1999 | Goodman et al. | 156/273.7 |
| 6,332,291 B1 | 12/2001 | Flosbach et al. | 52/91 |
| 6,335,381 B1 | 1/2002 | Hovestadt et al. | 522/84 |
| 6,617,413 B1 | 9/2003 | Bruchmann et al. | |
| 2004/0097611 A1 | 5/2004 | Nienhaus et al. | |

FOREIGN PATENT DOCUMENTS

| | | |
|---|---|---|
| CA | 2356685 | 6/2001 |
| DE | 198 18 735 | 10/1999 |
| DE | 198 60 041 | 6/2000 |
| EP | 0 549 116 | 11/1992 |
| EP | 0 928 800 | 12/1998 |
| EP | 0 952 170 | 4/1999 |
| WO | WO 91/11479 | 8/1991 |

OTHER PUBLICATIONS

English Language Abstract for EP 0 928 800.

* cited by examiner

*Primary Examiner*—James J. Seidleck
*Assistant Examiner*—Sanza L. McClendon

(57) ABSTRACT

A solvent-containing multicomponent system curable thermally and with actinic radiation (dual cure) and comprising
(A) at least one component comprising
  (A1) at least one constituent containing at least 1.8 meq/g of isocyanate-reactive functional groups,
  (A2) at least one constituent containing at least 1.8 meq/g of isocyanate-reactive functional groups and at least one functional group having at least one bond which can be activated with actinic radiation, and
(B) at least one component comprising at least one polyisocyanate (B1);
and its use as a coating material, adhesive or sealing compound.

17 Claims, No Drawings

MULTI-COMPONENT SYSTEM CONTAINING SOLVENTS, HARDENABLE BY THERMAL AND ACTINIC RADIATION AND THE USE THEREOF

CROSS REFERENCE TO RELATED APPLICATIONS

This application is the U.S. National Phase Application of International Patent Application PCT/EP01/11311 filed 01, Oct. 2001, which claims priority on DE 100 48 847.1, filed Oct. 2, 2000.

The present invention relates to a novel solvent-containing multicomponent system curable thermally and with actinic radiation. The present invention additionally relates to the use of the novel multicomponent system as a coating material, adhesive or sealing compound. The present invention further relates to the use of the novel coating materials for automotive OEM finishing, automotive refinishing, the coating of furniture, doors, windows or constructions in the interior and exterior sector, and also for industrial coating, including coil coating, container coating and the coating or impregnation of electrical components.

Here and below, actinic radiation is electromagnetic radiation such as near infrared (NIR), visible light, UV radiation or x-rays, especially UV radiation, or corpuscular radiation such as electron beams.

Among those in the art, curing with heat and actinic radiation is also referred to for short as dual cure.

A dual-cure multicomponent system is known, for example, from European Patent Application EP 0 928 800 A1. It comprises a urethane (meth)acrylate containing free isocyanate groups and (meth)acryloyl groups, a photoinitiator and an isocyanate-reactive compound, especially a polyol or polyamine. A constituent which [lacuna] both isocyanate-reactive functional groups and functional groups having at least one bond which can be activated with actinic radiation are not used. Although this dual-cure coating material offers the possibility of varying the profiles of properties of coating material and coating and of tailoring them to different end uses, its flash-off time is still too long and its initial hardness in the shadow zones of three-dimensional substrates of complex shape, which are not reached by the actinic radiation without the use of relatively expensive apparatus, is too low.

Moreover, dual-cure multicomponent systems are known from German Patent Application DE 198 18 735 A1. These systems necessarily comprise compounds (A) having one or more free-radically polymerizable double bonds and further comprising at least one other functional groups which is reactive in the sense of an addition reaction and/or condensation reaction, and compounds (B) having one or more free-radically polymerizable double bonds and further comprising at least one other functional group which is reactive in the sense of an addition reaction and/or condensation reaction, the additional reactive functional group being complementary or reactive with respect to the additional reactive functional groups of the compounds (A).

In addition, they may comprise at least one monomeric, oligomeric and/or polymeric compound (C) having at least one functional group which is reactive in the sense of an addition reaction and/or condensation reaction with respect to the functional groups of the compounds (A) or (B) that are present in addition to the free-radically polymerizable double bonds.

The advantages set out in the patent application, which are purportedly possessed by all of the systems described therein, however, stop at general indications and are not reinforced by a specific example. Leaving this aside, there is no statement of the minimum amounts in which the additional reactive functional groups should be present in the compounds.

It is an object of the present invention to find a new dual-cure multicomponent system from which the disadvantages of the prior art are now absent and which instead has a low flash-off time. Moreover, the intention is that the coatings produced using this system should have a high initial hardness, even in the problematic shadow zones of three-dimensional substrates of complex shape.

Moreover, the new dual-cure multicomponent system should be suitable both as a coating material and as an adhesive and sealing compound.

Furthermore, the new coating material should be outstandingly suitable for automotive OEM finishing, automotive refinishing, the coating of furniture, doors, windows or constructions in the interior and exterior sector, and also for industrial coating, including coil coating, container coating and the coating or impregnation of electrical components.

The coatings, adhesive films and seals produced from the new dual-cure multicomponent system should possess high scratch resistance, very good chemical, gasoline, solvent and etch resistance, and very good weathering stability and should not show any cracks.

The adhesive films and seals should exhibit a durable bond strength and, respectively, a durable sealing capacity even under extreme and/or rapidly changing climatic conditions.

Furthermore, the coatings should be outstandingly suitable as clearcoats as part of multicoat color and/or effect coating systems. The new clearcoats should have a high initial hardness, even in the problematic shadow zones of three-dimensional substrates of complex shape.

Accordingly, we have [lacuna] the novel solvent-containing multicomponent system curable thermally and with actinic radiation (dual cure) and comprising (A) at least one component comprising
  (A1) at least one constituent containing at least 1.8 meq/g of isocyanate-reactive functional groups,
  (A2) at least one constituent containing at least 1.8 meq/g of isocyanate-reactive functional groups and at least one functional group having at least one bond which can be activated with actinic radiation, and
(B) at least one component comprising at least one polyisocyanate (B1).

In the text below, the novel solvent-containing multicomponent system curable thermally and with actinic radiation is referred to [lacuna] the "multicomponent system of the invention".

The component (A) suitable for the multicomponent system of the invention comprises at least one constituent (A1) containing at least 1.8, preferably at least 2.0, and in particular at least 2.1, meq/g of isocyanate-reactive functional groups.

Examples of suitable isocyanate-reactive functional groups are thiol, primary or secondary amino, imino or hydroxyl groups, especially hydroxyl groups.

The constituent (A1) may be of low molecular mass, oligomeric or polymeric. Preferably it is oligomeric or polymeric.

The basic structures of the low molecular mass constituents (A1) are not critical but instead may derive from any of a very wide variety of organic compound classes. Examples of suitable classes of compound are alkyl, cycloalkyl, alkylcycloalkyl, cycloalkylalkyl, aryl, alkylaryl, cycloalkylaryl, arylalkyl and/or arylcycloalkyl compounds with or without heteroatoms such as oxygen, nitrogen, sulfur, silicon or phosphorus and optionally carrying further substituents which, however, must not react during the preparation of the constituents, their storage and/or their use with the bonds which can be activated with actinic radiation.

The basic structures of the oligomeric or polymeric constituents (A1) are likewise not critical and may derive from any of a wide variety of oligomer and polymer classes. Examples of suitable oligomer and polymer classes are random, alternating and/or block linear and/or branched and/or comb (co)polymers of ethylenically unsaturated monomers, or polyaddition resins and/or polycondensation resins. Regarding these terms, reference is made for further details to Römpp Lexikon Lacke und Druckfarben, Georg Thieme Verlag, Stuttgart, New York, 1998, page 457, "Polyaddition" and "Polyaddition resins (polyadducts)", and also pages 463 and 464, "Polycondensates", "Polycondensation" and "Polycondensation resins". As regards any substituents which may be present, the remarks made above apply accordingly.

Examples of highly suitable (co)polymers (A1) are poly (meth)acrylates and partially hydrolyzed polyvinyl esters.

Examples of highly suitable polyaddition resins and/or polycondensation resins (A1) are polyesters, alkyds, polyurethanes, polylactones, polycarbonates, polyethers, epoxy resin-amine adducts, polyureas, polyamides or polyimides.

In accordance with the invention, the (meth)acrylate copolymers, especially those containing hydroxyl groups, have particular advantages and in accordance with the invention are used with particular preference as constituents (A1).

The (meth)acrylate copolymers (A1) are polymers which are known per se. Their preparation has no special features as to method but instead takes place with the aid of the methods customary and known in the plastics field of the continuous or discontinuous free-radically initiated copolymerization in bulk, solution, emulsion, miniemulsion or microemulsion under atmospheric pressure or superatmospheric pressure in stirred vessels, autoclaves, tube reactors, loop reactors or Taylor reactors at temperatures from 50 to 200° C.

Examples of suitable (meth)acrylate copolymers (A1) and copolymerization methods are described in patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 and WO 98/02466.

In component (A), the constituents (A1) are present in widely varying amounts. Preferably, the component comprises the constituents (A1) in an amount of from 5 to 60, more preferably from 6 to 55 and in particular from 7 to 50% by weight, based in each case on component (A).

Additionally, component (A) comprises at least one, especially one, constituent (A2) having at least 1.8, preferably at least 2.0 and in particular at least 2.1, meq/g of isocyanate-reactive functional groups and at least one, preferably at least two and in particular three, functional groups having at least one bond which can be activated with actinic radiation.

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, especially the carbon-carbon double bonds ("double bonds"), are employed with preference.

Very suitable double bonds are present, for example, in (meth)acrylate, ethacrylate, crotonate, cinnamate, vinyl ether, vinyl ester, ethenylarylene, dicyclopentadienyl, norbornenyl, isoprenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference in accordance with the invention.

The constituent (A2) may be of low molecular mass, oligomeric or polymeric. Preferably it is oligomeric or polymeric.

The basic structure of the constituent (A2) is not critical. It is possible to use the basic structures described above for the constituent (A1).

Accordingly, the constituents (A2) come from the oligomer and/or polymer classes of the (meth)acryloyl-functional (meth)acrylic copolymers, polyether acrylates, polyester acrylates, polyesters, epoxy acrylates, urethane acrylates, amino acrylates, melamine acrylates, silicone acrylates and phosphazene acrylates and the corresponding methacrylates. It is preferred to use binders (a1) which are free from aromatic structural units. Use is therefore made preferably of urethane (meth)acrylates, phosphazene (meth)acrylates and/or polyester (meth)acrylates, with particular preference of urethane (meth)acrylates, especially aliphatic urethane (meth)acrylates.

The preparation of urethane (meth)acrylate (A2) having terminal and/or lateral double bonds has no special features in terms of its method but instead is described in detail in patent applications and patents DE 196 45 761 A, WO 98/10028, EP 0 742 239 A1, EP 0 661 321 B1, EP 0 608 021 B1, EP 0 447 998 B1, and EP 0 462 287 B1. Moreover, these constituents are commercially customary products and are sold, for example, under the brand name Rahn® 99-664 by the company Rahn.

In component (A), the constituents (A2) are present in widely varying amounts. Preferably, component [lacuna] comprises (the constituents (A1) in an amount of from 10 to 60, more preferably from 15 to 55, and in particular from 20 to 50% by weight, based in each case on component (A).

Furthermore, component (A) of the multicomponent system may further comprise customary and known additives in effective amounts. The essential factor is that the additives do not inhibit or prevent entirely the dual-cure crosslinking reactions.

Examples of suitable additives are nanoparticles, reactive diluents curable thermally or with actinic radiation, low-boiling organic solvents and high-boiling organic solvents ("long solvents"), water, UV absorbers, light stabilizers, free-radical scavengers, thermally labile free-radical initiators, photoinitiators and photocoinitiators, crosslinking agents as used in one-component systems, thermal crosslinking catalysts, devolatilizers, slip additives, polymerization inhibitors, defoamers, emulsifiers, wetting agents, dispersants, adhesion promoters, levelling agents, film-forming auxiliaries, sag control agents (SCAs), rheology control additives (thickeners), flame retardants, siccatives, dryers, antiskinning agents, corrosion inhibitors, waxes, flatting agents, precursors of organically modified ceramic materials, or additional binders.

Examples of suitable thermally curable reactive diluents are positionally isomeric diethyloctanediols or hydroxyl-containing hyperbranched compounds or dendrimers, as described for example in German Patent Applications DE 198 05 421 A1, DE 198 09 643 A1, and DE 198 40 405 A1.

Examples of suitable reactive diluents curable with actinic radiation are those described in Römpp Lexikon Lacke und Druckfarben, Georg Thieme Verlag, Stuttgart, New York, 1998, on page 491 under the entry "reactive diluents" or in column 7 lines 1 to 26 of DE 198 18 715 A1, or reactive diluents having at least 5, especially 5, bonds which can be activated with actinic radiation in their molecule, such as dipentaerythritol pentacrylate, for example.

Examples of suitable low-boiling organic solvents and high-boiling organic solvents ("long solvents") are ketones such as methyl ethyl ketone, methyl isoamyl ketone or methyl isobutyl ketone, esters such as ethyl acetate; butyl acetate, ethyl ethoxypropionate, methoxypropyl acetate or butyl glycol acetate, ethers such as dibutyl ether or ethylene glycol, diethylene glycol, propylene glycol, dipropylene glycol, butylene glycol or dibutylene glycol dimethyl, diethyl or dibutyl ether, N-methylpyrrolidone or xylenes or mixtures of aromatic and/or aliphatic hydrocarbons such as Solventnaphtha®, mineral spirit 135/180, dipentenes or Solvesso®.

Examples of suitable thermally labile free-radical initiators are organic peroxides, organic azo compounds or C-C-cleaving initiators such as dialkyl peroxides, peroxocarboxylic acids, peroxodicarbonates, or peroxide esters, hydroperoxides, ketone peroxides, azo dinitriles or benzpinacol silyl ethers.

Examples of suitable crosslinking catalysts are dibutyltin dilaurate, dibutyltin dioleate, lithium decanoate, zinc octoate or bismuth salts such as bismuth lactate or bismuth dimethylolpropionate.

Examples of suitable photoinitiators and coinitiators are described in Römpp Lexikon Lacke und Druckfarben, Georg Thieme Verlag, Stuttgart, 1998, pages 444 to 446.

Examples of suitable additional crosslinking agents as used in one-component systems are amino resins, as described for example in Römpp Lexikon Lacke und Druckfarben, Georg Thieme Verlag, 1998, page 29, "Amino resins", in the text book "Lackadditive" [Additives for Coatings] by Johan Bieleman, Wiley-VCH, Weinheim, New York, 1998, pages 242 ff., in the book "Paints, coatings and solvents", second, completely revised edition, D. Stoye and W. Freitag (eds.), Wiley-VCH, Weinheim, N.Y., 1998, pages 80 ff., in patents U.S. Pat. No. 4,710,542 A1 and EP-B-0 245 700 A1, and in the article by B. Singh and coworkers, "Carbamylmethylated Melamines, Novel Crosslinkers for the Coatings Industry" in Advanced Organic Coatings Science and Technology Series, 1991, Volume 13, pages 193 to 207; carboxyl-containing compounds or resins, as described for example in patent DE 196 52 813 A1; resins or compounds containing epoxide groups, as described for example in patents EP 0 299 420 A1, DE 22 14 650 B1, DE 27 49 576 B1, U.S. Pat. No. 4,091,048 A and U.S. Pat. No. 3,781,379 A; blocked polyisocyanates, as described for example in patents U.S. Pat. No. 4,444,954 A, DE 196 17 086 A1, DE 196 31 269 A1, EP 0 004 571 A1 and EP 0 582 051 A1; and/or tris(alkoxycarbonylamino)triazines as described in patents U.S. Pat. No. 4,939,213 A, U.S. Pat. No. 5,084,541 A, U.S. Pat. No. 5,288,865 A and EP 0 604 922 A1.

Examples of suitable devolatilizers are diazadicycloundecane and benzoin.

Examples of suitable emulsifiers are nonionic emulsifiers, such as alkoxylated alkanols, polyols, phenols and alkylphenols, or anionic emulsifiers such as alkali metal salts or ammonium salts of alkanecarboxylic acids, alkanesulfonic acids, and sulfo acids of alkoxylated alkanols, polyols, phenols and alkylphenols.

Examples of suitable wetting agents are siloxanes, fluorine compounds, carboxylic monoesters, phosphoric esters, polyacrylic acids and their copolymers, or polyurethanes.

An example of a suitable adhesion promoter is tricyclodecanedimethanol.

Examples of suitable film-forming auxiliaries are cellulose derivatives such as cellulose acetobutyrate (CAB).

Examples of suitable transparent fillers are those based on silicon dioxide, aluminum oxide or zirconium oxide; for further details, reference is made to Römpp Lexikon Lacke und Druckfarben, Georg Thieme Verlag, Stuttgart, 1998, pages 250 to 252.

Examples of suitable sag control agents are ureas, modified ureas and/or silicas, as described for example in the literature references EP 0 192 304 A1, DE 23 59 923 A1, DE 18 05 693 A1, WO 94/22968, DE 27 51 761 C1, WO 97/12945 or "farbe+lack", 11/1992, pages 829 ff.

Examples of suitable rheology control additives are those known from patents WO 94/22968, EP 0 276 501 A1, EP 0 249 201 A1 and WO 97/12945; crosslinked polymeric microparticles, as disclosed for example in EP 0 008 127 A1; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives or hydrophobically modified ethoxylated urethanes or polyacrylates.

An example of a suitable flatting agent is magnesium stearate.

Examples of suitable precursors of organically modified ceramic materials are hydrolyzable organometallic compounds, especially of silicon and aluminum.

Further examples of the above-listed additives and also examples of suitable UV absorbers, free-radical scavengers, levelling agents, flame retardants, siccatives, dryers, antiskinning agents, corrosion inhibitors and waxes (B) are described in detail in the text book "Lackadditive" by Johan Bieleman, Wiley-VCH, Weinheim, N.Y., 1998.

The preparation of component (A) for use in accordance with the invention has no special features but instead takes place in a customary and known manner by mixing of the above-described constituents in appropriate mixing equipment such as stirred vessels, dissolvers, stirred mills or extruders.

Component (B) of the multicomponent system of the invention comprises at least one polyisocyanate (B1).

The polyisocyanates (B1) contains on average at least 2.0, preferably more than 2.0, and in particular more than 3.0 isocyanate groups per molecule. Basically, there is no upper limit on the number of isocyanate groups; in accordance with the invention, however, it is of advantage if the number does not exceed 15, preferably 12, with particular preference 10, with very particular preference 8.0, and in particular 6.0.

Examples of suitable polyisocyanates (B1) are isocyanato-containing polyurethane prepolymers which may be prepared by reacting polyols with an excess of diisocyanates and are preferably of low viscosity.

Examples of suitable diisocyanates are isophorone diisocyanate (i.e., 5-isocyanato-1-isocyanatomethyl-1,3,3-trimethylcyclohexane), 5-isocyanato-1-(2-isocyanatoeth-1-yl)-

1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanatoeth-1-yl)cyclohexane, 1-isocyanato-2-(4-iso-cyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimeric fatty acids, as sold under the commercial designation DDI 1410 by the company Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatopropy-1-yl)cyclohexane, 1,2-, 1,4- or 1,3-bis(4-isocyanatobut-1-yl)cyclohexane or liquid bis(4-isocyanatocyclohexyl)methane with a trans/trans content of up to 30% by weight, preferably 25% by weight and in particular 20% by weight, as described in patent applications DE 44 14 032 A1, GB 1220717 A1, DE 16 18 795 A1 and DE 17 93 785 A1, preferably isophorone diisocyanate, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane or HDI, especially HDI.

It is also possible to use polyisocyanates (B1) containing isocyanurate, biuret, allophanate, iminooxadiazinedione, urethane, urea, carbodiimide and/or uretdione groups, which are prepared in a customary and known manner from the diisocyanates described above. Example of suitable preparation techniques and polyisocyanates are known, for example, from patents CA 2,163,591 A, U.S. Pat. No. 4,419,513, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 and EP 0 531 820 A1.

The amount of the polyisocyanates (B1) in component (B) may vary widely. Primarily it is guided by the viscosity necessary for mixing with the other components. Preferably, the amount is from 20 to 80, more preferably from 30 to 70, and in particular from 35 to 65% by weight, based on component (B). Component (B) preferably further comprises at least one of the above-described organic solvents.

Furthermore, component (B) may comprise at least one, especially one, constituent (B2) containing at least one isocyanate group and at least one functional group having at least one bond which can be activated with actinic radiation.

These constituents (B2) are obtainable, as is known, by reacting the above-described diisocyanates and polyisocyanates (B1) with compounds containing at least one, especially one, of the above-described isocyanate-reactive functional groups and at least one, especially one, bond which can be activated with actinic radiation. Examples of suitable compounds of this kind are 2-hydroxyethyl, 2-hydroxypropyl, 3-hydroxypropyl, 3-hydroxybutyl, 4-hydroxybutyl, bis(hydroxymethyl) cyclohexane, neopentyl glycol, diethylene glycol, dipropylene glycol, dibutylene glycol, and triethylene glycol acrylate, methacrylate, ethacrylate, crotonate, cinnamate, vinyl ether, allyl ether, dicyclopentadienyl ether, norbornenyl ether, isoprenyl ether, isopropenyl ether or butenyl ether;

trimethylolpropane di-, glycerol di-, trimethylolethane di-, pentaerythritol tri- or homopentaerythritol tri-acrylate, methacrylate, ethacrylate, crotonate, cinnamate, vinyl ether, allyl ether, dicyclopentadienyl ether, norbornenyl ether, isoprenyl ether, isopropenyl ether or butenyl ether; or reaction products of cyclic esters, such as epsilon-caprolactone, for example, and the above-described hydroxyl-containing monomers; or 2-aminoethyl (meth)acrylate and/or 3-aminopropyl (meth)acrylate.

In terms of method, the preparation of these constituents (B2) has no special features but instead takes place as described, for example, in European Patent Application EP 0 928 800 A1.

Preparation of component (B) has no special features in terms of its method but instead takes place by the mixing of its constituents. In order to establish a low viscosity, component (B) may further be admixed with at least one of the above-described organic solvents.

Where the multicomponent system of the invention comprises only components (A) and (B), it constitutes a two-component system. However, different constituents of the individual components (A) and/or (B) may be stored separately from these components and combined not until shortly before application to form the multicomponent system. In general, the two-component system is preferred since it entails less effort for its preparation.

The preparation of the multicomponent systems of the invention from the above-described components (A) and (B) has no special features in terms of its method but instead is carried out with the aid of the customary and known, above-described mixing equipment and mixing techniques or by means of customary two-component or multicomponent metering and mixing units. Ideally, mixing takes place by hand if permitted by the viscosity of component (A) and (B).

The weight ratio of component (A) to component (B) may vary widely. It is guided primarily by the functionality and concentration of the above-described reactive constituents of the components, especially (A1) and (A2) on the one hand and (B1) on the other hand. The skilled worker will therefore easily be able to determine the optimum volume ratio for each individual case on the basis of his or her knowledge of the art, with or without the assistance of simple rangefinding tests. The weight ratio is preferably from 3:1 to 1:3, more preferably from 2.7:1 to 1:2.7, and in particular from 2.5:1 to 1:2.5.

The multicomponent systems of the invention may be used for a very wide variety of purposes. Preferably, they are used as coating materials, adhesives and sealing compounds.

The coating materials, adhesives and sealing compounds of the invention are used to produce coatings, adhesive films and seals on and/or in primed and unprimed substrates. The coating materials of the invention are used in particular to produce clearcoats, especially clearcoats in multicoat color and/or effect coating systems.

In terms of method, the application of the clearcoat materials of the invention has no special features but instead may take place by any customary application method, such as spraying, knifecoating, brushing, flowcoating, dipping, trickling or rolling, for example. It is preferred to employ spray application methods, such as compressed air spraying, airless spraying, high-speed rotation, electrostatic spray application (ESTA), alone or in conjunction with hot spray applications such as hot-air spraying, for example.

Suitable substrates are surfaces which are not damaged by curing of the coating materials, adhesives and/or sealing compounds present thereon using heat and actinic radiation; examples are metals, plastics, wood, ceramic, stone, textile, fiber composites, leather, glass, glass fibers, glass wool, rockwool, mineral-bound and resin-bound building materials, such as plasterboard and cement slabs or roof tiles, and also assemblies of these materials.

Accordingly, the coating materials, adhesives and sealing compounds of the invention are also suitable for applications outside of automotive OEM finishing and automotive refinishing. In this context they are particularly suitable for the coating, adhesive bonding or sealing of furniture, windows, doors, constructions in the interior and exterior sector, and for industrial coating, including coil coating, container coating and the impregnation or coating of electrical components. In the context of industrial coatings, they are suitable for coating, adhesive bonding and/or sealing virtually all parts for private or industrial use, such as radiators, domestic appliances, small metal parts such as nuts and bolts, wheel caps, wheel rims, packaging, or electrical components such as motor windings or transformer windings.

In the case of electrically conductive substrates, it is possible to use primers which are produced in a customary and known manner from the electrodeposition coating materials. Both anodic and cathodic electrodeposition coating materials are suitable for this purpose, but especially cathodic materials.

The electrodeposition coating or electrodeposition film may be overcoated with a surfacer, which is cured either alone or together with the electrodeposition film (wet-on-wet technique). Over-coating with a surfacer is carried out in particular in the regions exposed to severe mechanical stress, such as by stone chipping, for example.

Examples of suitable cathodic electrodeposition coating materials and also, where appropriate, of wet-on-wet techniques are described in Japanese Patent Application 1975-142501 (Japanese Laid-open Specification JP 52-065534 A2, Chemical Abstracts No. 87: 137427) or in the patents and patent applications U.S. Pat. No. 4,375,498 A, U.S. Pat. No. 4,537,926 A, U.S. Pat. No. 4,761,212 A, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1, and WO 98/07794.

Similarly, suitable surfacers, especially aqueous surfacers, which are also known as antistone-chip primers or functional coats, are known from the patents and patent applications U.S. Pat. No. 4,537,926 A, EP 0 529 335 A1, EP 0 595 186 A1, EP 0 639 660 A1, DE 44 38 504 A1, DE 43 37 961 A1, WO 89/10387, U.S. Pat. No. 4,450,200 A, U.S. Pat. No. 4,614,683 A and WO 94/26827.

It is also possible to coat, adhesively bond or seal primed or unprimed plastics parts made, for example, from ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728P1). Unfunctionalized and/or nonpolar substrate surfaces may be subjected prior to coating in a known manner to a pretreatment, such as by plasma or by flaming, or may be provided with a primer.

In accordance with the invention, the clearcoats of the invention are produced by applying the clearcoat materials of the invention to the substrates described above, after which the resultant clearcoat films are cured.

In accordance with the invention, the adhesive films and seals of the invention are produced by applying the adhesives and sealing compounds of the invention onto and/or into the substrates described above. In the case of the adhesive bonding of substrates, the surfaces of two or more substrates to be bonded are preferably coated with the adhesive of the invention, after which the surfaces in question are contacted, under pressure if desired, and the resultant adhesive films are cured.

As is known, the production of a multicoat color and/or effect coating system on a primed or unprimed substrate takes place by (1) applying a basecoat material to the substrate,
(2) drying and/or partly or fully curing the basecoat film,
(3) applying a clearcoat material to the dried and/or partly cured basecoat film or to the cured basecoat, and
(4) jointly curing the clearcoat film with the basecoat film, or separately curing the clearcoat film.

Examples of suitable basecoat materials are known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 and EP 0 817 684, column 5, lines 31 to 45.

In general, the surfacer film, topcoat film, basecoat film and clearcoat film are applied in a wet film thickness such that curing thereof results in coats having the film thicknesses advantageous and necessary for their functions. In the case of the surfacer film this film thickness is from 10 to 150, preferably from 15 to 120, with particular preference from 20 to 100, and in particular from 25 to 90 μm, in the case of the topcoat it is from 5 to 90, preferably from 10 to 80, with particular preference from 15 to 60, and in particular from 20 to 50 μm, in the case of the basecoat it is from 5 to 50, preferably from 6 to 40, with particular preference from 7 to 30, and in particular from 8 to 25 μm, and in the case of the clearcoats it is from 10 to 100, preferably from 15 to 90, with particular preference from 20 to 80, and in particular from 25 to 70 μm.

Complete curing can take place after a certain flash-off time. This is used for example for leveling and for the degassing of the applied films or for the evaporation of volatile constituents such as solvents or water. The rest time may be assisted and/or shortened by the use of elevated temperatures up to 40° C. and/or by blowing the films, provided this does not entail any damage or alteration to the applied films, such as premature complete crosslinking, for example. The clearcoats of the invention have an advantageously short flash-off time of <10, especially <5 minutes. This produces a shortening in the process times overall.

In accordance with the invention the curing takes place with actinic radiation, especially with UV radiation, and/or electron beams. If desired, it may be supplemented by or carried out with actinic radiation from other radiation sources. In the case of electron beams, it is preferred to operate under an inert gas atmosphere. This may be ensured, for example, by supplying carbon dioxide and/or nitrogen directly to the surface of the applied films.

In the case of curing with UV radiation as well it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. Their arrangement is known in principle and may be adapted to the circumstances of the workpiece and the process parameters. In the case of workpieces of complex shape such as automobile bodies, the regions not accessible by direct radiation (shadow regions) such as cavities, folds and other structural undercuts may be cured using point, small-area or all-round sources, in conjunction with an automatic movement device for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

The cure may be effected in stages, i.e., by multiple exposure to light or actinic radiation. This can also be done alternatingly, i.e., by curing in alternation with UV radiation and electron beams.

Thermal curing as well has no special features in terms of method but instead takes place in accordance with the customary and known methods such as heating in a forced air oven or irradiation with IR lamps. As for curing with actinic radiation, thermal curing may also take place in stages. Thermal curing is preferably effected at room temperature or above room temperature, preferably at temperatures >40° C., preferably >50° C., for a period of from one minute to several days.

Thermal curing and curing with actinic radiation may be used simultaneously or in alternation. Where the two curing methods are used in alternation, it is possible, for example, to commence with thermal curing and end with actinic radiation curing. In other cases, it may prove advantageous to commence and to end with actinic radiation curing. The skilled worker is able to determine the curing method which is most advantageous for the particular case in hand, on the basis of his general knowledge of the art with the assistance, if appropriate, of simple preliminary tests.

The coating materials, adhesives and sealing compounds of the invention have a high solids content, in combination with low viscosity and a long stability time.

The flash-off time of the multicomponent systems of the invention, especially of the clearcoat material of the invention, prior to curing is very short, so that overall the process times are reduced.

The coatings, adhesive films and seals produced with the aid of the multicomponent systems of the invention, especially the clearcoats of the invention, have a high initial hardness even in the shadow regions of the substrates.

The resultant coatings of the invention, especially the clearcoats and the multicoat color and/or effect coating systems comprising them, possess high hardness, flexibility and chemical resistance, outstanding leveling, no runs, very good intercoat adhesion, an outstanding overall appearance, very good weathering stability, very high scratch resistance and abrasion resistance, and very good polishability.

The adhesive films of the invention possess long-term and high bond strength even under extreme and/or very sharply and rapidly changing climatic conditions.

The seals of the invention provide long-term and complete sealing against chemically aggressive substances.

Consequently, the primed and unprimed substrates of the invention coated with at least one coating of the invention, bonded with at least one adhesive film of the invention and/or sealed with at least one seal of the invention possess a particularly long service life in addition to the advantages set out above, so making them particularly valuable from an economic standpoint.

EXAMPLES AND COMPARATIVE EXPERIMENT

Preparation Example 1

The Preparation of a Thermally Curable Methacrylate Copolymer

A steel reactor equipped with stirrer, reflux condenser and two feed vessels was charged with 185.6 parts by weight of ethyl ethoxypropionate and this initial charge was heated with stirring to 160° C. Subsequently, a monomer mixture of 114.1 parts by weight of styrene, 136.9 parts by weight of methyl methacrylate, 79.3 parts by weight of butyl methacrylate, 109 parts by weight of n-butyl acrylate and 164.1 parts by weight of hydroxyethyl methacrylate was metered in at a uniform rate over the course of four hours. Beginning at the same time and in parallel with this monomer mixture, an initiator mixture of 35.8 parts by weight of ethyl ethoxypropionate and 36.2 parts by weight of di-tert-butyl peroxide was metered in at a uniform rate. After one hour, initiation was repeated at 110° C. with an initiator mixture of 5.7 parts by weight of butyl acetate and 0.5 parts by weight of tert-butyl peroxyethylhexanoate. Subsequently, the resultant reaction mixture was held at 110° C. for one hour. Thereafter, at 80° C., the solution was adjusted to a solids content of 65% by weight using butyl acetate. The resultant solution had a viscosity of 15 dpas. The hydroxyl number of the methacrylate copolymer was 120 mg KOH/g.

Examples 1 and 2 and Comparative Experiment 1

The Preparation of Inventive Clearcoat Materials (examples 1 and 2) and of a Noninventive Clearcoat Material (Comparative Experiment 1) and Their use to Produce Multicoat Color and Effect Coating Systems The inventive clearcoat materials of examples 1 and 2 and the noninventive clearcoat material of comparative experiment 1 were prepared by mixing the constituents indicated in table 1. For this purpose, components (A) and (B) were each mixed with one another in a weight ratio of 2:1 and were subsequently diluted with 10%, based on the clearcoat materials, of a diluent (solvent mixture comprising xylene, solvent naphtha, mineral spirit 135/180, methoxypropyl acetate, butyl acetate, butyl glycol acetate, ethyl ethoxypropionate and dipentenes).

TABLE 1

The material composition of the inventive clearcoat materials (examples 1 and 2) and of the noninventive clearcoat material (comparative experiment 1)

| Constituent | Example 1 | Example 2 | Comparative experiment 1 |
|---|---|---|---|
| Component (A): | | | |
| Methacrylate copolymer of preparation example 1 | 30 | — | 30 |
| Urethane acrylate 1[a)] | 43 | — | — |
| Polyester acrylate 2[b)] | — | 30 | 43 |
| Polyester acrylate 3[c)] | — | 43 | — |
| Butyl acetate | 4.8 | 4.8 | 4.8 |
| Ethyl ethoxyproprionate | 15 | 15 | 15 |
| Methyl isoamyl ketone | 2 | 2 | 2 |
| Byk ® 325[d)] | 0.3 | 0.3 | 0.3 |
| Byk ® 358[d)] | 0.7 | 0.7 | 0.7 |
| Tinuvin ® 292[e)] | 1 | 1 | 1 |
| Tinuvin ® 400[e)] | 1 | 1 | 1 |
| Irgacure ® 184[f)] | 1.4 | 1.4 | 1.4 |
| Lucirin ® TPO[f)] | 0.3 | 0.3 | 0.3 |
| Dibutyltin dilaurate (10% strength in butyl acetate) | 0.5. | 0.5 | 0.5 |
| Component (B): | | | |
| Desmodur ® N 3600[g)] | 56 | 56 | 50 |
| Methyl isoamyl ketone | 22 | 22 | 25 |
| Ethyl ethoxypropionate | 22 | 22 | 25 |

[a)]Urethane acrylate 1: commercially customary urethane acrylate Rahn ® 99–664 from Rahn, acrylate functionality: 3; hydroxyl number: 120 mg KOH/g, corresponding to 2.14 meq/g;
[b)]Polyester acrylate 2: Laromer ® 8981 from BASF Aktiengesellschaft, hydroxyl number: 80 mg KOH/g, corresponding to 1.4 meq/g;
[c)]Polyester acrylate 3: Laromer ® 8907 from BASF Aktiengesellschaft, hydroxyl number: 120 mg KOH/g, corresponding to 2.14 meq/g;
[d)]commercially customary leveling agents;
[e)]commercially customary light stabilizers;
[f)]commercially customary photoinitiators;
[g)]commercially customary polyisocyanate based on hexamethylene diisocyanate, from Bayer AG.

To produce the multicoat color and effect coating systems, sanded steel panels were first of all coated with a commercially customary two-component polyurethane surfacer from BASF Coatings AG. The surfacer was applied in two spray passes, dried at 60° C. for 30 minutes and then sanded. Subsequently, an aqueous basecoat material was applied in two spray passes and dried at 60° C. for 5 minutes. Thereafter, the clearcoat materials 1 and 2 were applied in two spray passes with a flash-off time of 2.5 minutes in between.

The applied clearcoat films of examples 1 and 2 and the clearcoat material of comparative experiment 1 were flashed off for 5 minutes, dried at 60° C. for 15 minutes and then cured with UV radiation at a dose of 1500 mJ/cm². The resultant clearcoats had a film thickness of from 50 to 60 μm. The multicoat systems of the invention, of examples 1 and 2, had an outstanding appearance, which was superior to that of the multicoat system of comparative experiment 1.

To determine the initial hardness, the pendulum hardness of the applied clearcoat films was measured in accordance with König (pendulum impacts). The results are given in Table 2. They demonstrate the high initial hardness of the clearcoats of examples 1 and 2 in comparison to the initial hardness of the clearcoat of comparative experiment 1.

In a second series of tests, the curing characteristics of the clearcoat materials in shadow zones of substrates were simulated by not UV-curing the test panels described above. The resultant clearcoats of examples 1 and 2 were not tacky but instead had a good initial hardness. In contrast, the clearcoat of comparative experiment 1 was tacky.

TABLE 2

Initial hardness of the clearcoat of example 1 in comparison to the initial hardness of the clearcoat of comparative experiment 1

| | Pendulum impacts | | |
|---|---|---|---|
| Curing conditions | Example 1 | Example 2 | Comparative experiment 1 |
| Test series 1: Curing with UV radiation: | | | |
| after 5 days | 105 | 100 | 88 |
| after 10 days | 135 | 130 | 123 |
| Test series 1: Curing without UV radiation: | | | |
| after 5 days | 67 | 59 | 19 |
| after 10 days | 101 | 95 | 43 |

The invention claimed is:

1. A multicomponent system curable thermally and with actinic radiation, comprising
   (A) at least one component comprising
      (A1) at least one constituent comprising an oligomer and/or a polymer each having at least 1.8 meq/g of isocyanate-reactive functional groups,
      (A2) at least one constituent comprising an oligomer and/or a polymer each having at least 1.8 meq/g of isocyanate-reactive functional groups comprising at least one functional group having at least one bond activatedable by actinic radiation, and
   (B) at least one component comprising at least one polyisocyanate constituent (B1).

2. The system of claim 1, wherein component (B) further comprises at least one constituent (B2) comprising at least one isocyanate group and at least one functional group comprising at least one bond activatable by actinic radiation.

3. The system of claim 2, wherein the bonds activatable by actinic radiation of constituent (A2) and (B2) are selected from the group consisting of carbon-hydrogen single bonds, carbon-carbon single bonds, carbon-carbon double bonds, carbon-oxygen single bonds, carbon-oxygen double bonds, carbon-nitrogen single bonds, carbon-nitrogen double bonds, carbon-phosphorus single bonds, carbon-phosphorus double bonds, carbon-silicon single bonds, carbon-silicon double bonds, and mixtures thereof.

4. The system of claim 3, wherein the bonds activatable by actinic radiation are carbon-carbon double bonds.

5. The system of claim 4, wherein the carbon-carbon double bonds are present in a functional group selected from the group consisting of (meth)acrylate, ethacrylate, crotonate, cinnamate, vinyl ether, vinyl ester, ethenylarylene, dicyclopentadienyl, norbornenyl, isoprenyl, isopropenyl, allyl, butenyl, ethenylarylene ether, dicyclopentadienyl ether, norbornenyl ether, isoprenyl ether, isopropenyl ether, allyl ether, butenyl ether, ethenylarylene ester, dicyclopentadienyl ester, norbornenyl ester, isoprenyl ester, isopropenyl ester, allyl ester, butenyl ester, and mixtures thereof.

6. The system of claim 1, wherein the isocyanate-reactive functional groups are selected from the group consisting of thiol, primary amino, secondary amino, imino, hydroxyl groups, and mixtures thereof.

7. The system of claim 1, wherein constituent (A1) comprises at least one member selected from the group consisting of (co)polymers of ethylenically unsaturated monomers, polyaddition resins, polycondensation resins, and mixtures thereof.

8. The system of claim 1, wherein constituent (A2) comprises on average three functional groups comprising at least one bond activatable with actinic radiation per molecule.

9. The system of claim 1, wherein constituent (A2) comprises at least one member selected from the group consisting of (co)polymers of ethylenically unsaturated monomers, polyaddition resins, polycondensation resins, and mixtures thereof.

10. The system of claim 1, wherein at least one of component (A) or component (B) comprise at least one reactive diluent curable with actinic radiation.

11. The system or claim 10, wherein the reactive diluent curable with actinic radiation comprises at least 5 bonds activatable by actinic radiation per molecule.

12. The system of claim 1 which is a coating material, adhesive or sealing compound.

13. A method of making a coated substrate, comprising applying the system of claim 12 to a substrate selected from the group consisting of automotive OEM finishing substrates, automotive refinishing substrates, furniture substrates, door substrates, window substrates, interior substrates, exterior substrates, industrial coating substrates, coil coating substrates, container substrates, or electrical component substrates, and curing the system.

14. The method of claim 13, wherein applying is a wet-on-wet technique.

15. The system of claim 7, wherein the (co)polymers of ethylenically unsaturated monomers comprise at least one member selected from the group consisting of oligomers, polymers, random (co)polymers, alternating (co)polymers, block (co)polymers, linear (co)polymers, branched (co)polymers, comb (co)polymers, and mixtures thereof.

16. The system of claim 9, wherein the (co)polymers of ethylenically unsaturated monomers comprise at least one member selected from the group consisting or oligomers, polymers, random (co)polymers, alternating (co)polymers, block (co)polymers, linear (co)polymers, branched (co)polymers, com (co)polymers, and mixtures thereof.

17. The system of claim 1, wherein component (B) further comprises at least one constituent (B2) comprising at least one isocyanate group and at least one functional group comprising at least one bond activatable by actinic radiation, and wherein constituent (A2) comprises on average three functional groups comprising at least one bond activatable with actinic radiation per molecule.

* * * * *